(12) United States Patent
Zang et al.

(10) Patent No.: US 9,107,076 B1
(45) Date of Patent: Aug. 11, 2015

(54) DATA FRAUD DETECTION VIA DEVICE TYPE IDENTIFICATION

(75) Inventors: Hui Zang, Cupertino, CA (US); Sara Gatmir-Motahari, Millbrae, CA (US); Chen-Nee Chuah, Davis, CA (US); Han Liu, Davis, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 305 days.

(21) Appl. No.: 13/560,277

(22) Filed: Jul. 27, 2012

(51) Int. Cl.
*H04M 1/66* (2006.01)
*H04W 12/12* (2009.01)

(52) U.S. Cl.
CPC ........................... *H04W 12/12* (2013.01)

(58) Field of Classification Search
CPC ..... H04W 12/00; H04W 12/06; H04W 12/12; H04M 15/41; H04M 15/147
USPC ............... 455/405, 406, 410, 411, 412.2, 415
See application file for complete search history.

(56) References Cited

U.S. PATENT DOCUMENTS

| | | | |
|---|---|---|---|
| 2004/0132484 A1* | 7/2004 | Murakami | 455/550.1 |
| 2006/0009195 A1* | 1/2006 | Itoh | 455/411 |
| 2008/0242405 A1* | 10/2008 | Chen et al. | 463/29 |
| 2008/0267375 A1* | 10/2008 | Betts et al. | 379/189 |
| 2008/0310608 A1* | 12/2008 | Johnson et al. | 379/112.01 |
| 2010/0145771 A1* | 6/2010 | Fligler et al. | 705/10 |
| 2010/0330954 A1* | 12/2010 | Manning Cassett et al. | 455/405 |

* cited by examiner

*Primary Examiner* — Dai A Phuong (57) ABSTRACT

Systems, methods and computer-readable media for detecting potential data fraud in a telecommunications environment are provided. The methods include referencing a characteristic associated with a device, where the characteristic provides an indication of a device type for a device. From the referenced characteristic, a device type is predicted. A comparison is made between the predicted device type and an expected device type that is identified based on the credentials being used by the device. Thereafter, a determination that the device is potentially performing data fraud can be made based on whether predicted device type matches the expected device type.

18 Claims, 11 Drawing Sheets

DATA FRAUD DETECTION VIA DEVICE TYPE IDENTIFICATION

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, subject matter described herein includes ways of detecting data fraud in a telecommunications environment. In the process of committing data fraud within a telecommunications environment, a fraudulent device may clone one or more credentials associated with a legitimate device. Such credentials can be associated with an expected device type, for example, that is stored in a data store. In detecting data fraud, characteristics associated with a device can be referenced and used to predict a device type for the device. Thereafter, the predicted device type is compared to an expected device type and, such a comparison is used to determine whether the device is potentially committing data fraud.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CD-ROM Compact Disk Read Only Memory
CDF Cumulative Distribution Function
CDMA Code Division Multiple Access
CDN Content Distribution Network
DOS Disk Operating System
DVD Digital Versatile Discs
EEPROM Electrically Erasable Programmable Read Only Memory
ESN Electronic Serial Number
GPRS General Packet Radio Service
GSM Global System for Mobile Communication
HSDPA High-Speed Downlink Packet Access
IP Internet Protocol
LED Light Emitting Diode
LTE Long Term Evolution
MIN Mobile Identification Number
NAI Network Access Identifier
RAM Random Access Memory
ROM Read Only Memory
TDMA Time Division Multiple Access
TCP Transmission Control Protocol
USP User Datagram Protocol
UMTS Universal Mobile Telecommunications System
USB Universal Serial Bus
VoIP Voice over Internet Protocol
WCDMA Wideband Code Division Multiple Access
WiMAX Worldwide Interoperability for Microwave Access Further, various technical terms are used throughout this description. A definition of such terms can be found in *Newton's Telecom Dictionary* by H. Newton, 23rd Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention relate to systems, methods, and computer-readable storage media for detecting data fraud using the one or more characteristics and one or more credentials of a device. Accordingly, one embodiment of the present invention is directed to a method for detecting data fraud. The method includes referencing a characteristic associated with a device, where the characteristic provides an indication of a device type for the device. The method includes determining a predicted device type of the device based on the characteristics. The method further includes comparing the predicted device type to an expected device type that is a device type expected for the device based on one or more credentials being used by the device. Additionally, the method includes determining that the device is potentially performing data fraud based on the predicted device type not matching the expected device type.

In another aspect, embodiments of the present invention include a system for detecting data fraud. The system includes a feature referencing component that references one or more characteristics associated with a device being used. The system includes a device predicting component that predicts a device type using the one or more characteristics associated with the device. The system further includes a fraud determining component that compares the predicted device type to an expected device type and, based on the comparison, determined whether data fraud is potentially occurring via the device.

In yet another aspect, embodiments of the present invention include one or more computer readable media having computer-executable instructions embodied thereon that, when executed, perform a method for detecting data fraud. The method includes referencing one or more characteristics associated with one or more features for a device, where each of the one or more characteristics indicate a type of device. The method includes using the one or more characteristics associated with the one or more features to determine a predicted device type, wherein the predicted device types is a feature phone, a smart phone or an air card. The method further includes referencing an expected device type associated with at least one credential used by the device to access a telecommunications network, comparing the predicted device type to the expected device type and, based on the comparison, determining whether the device is potentially being used to perform data fraud via the telecommunications network. When the predicted device type matches the expected device type, the device is determined to be a legitimate device. When the predicted device type does not match the expected device type, the device is determined to be a fraudulent device.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprises media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
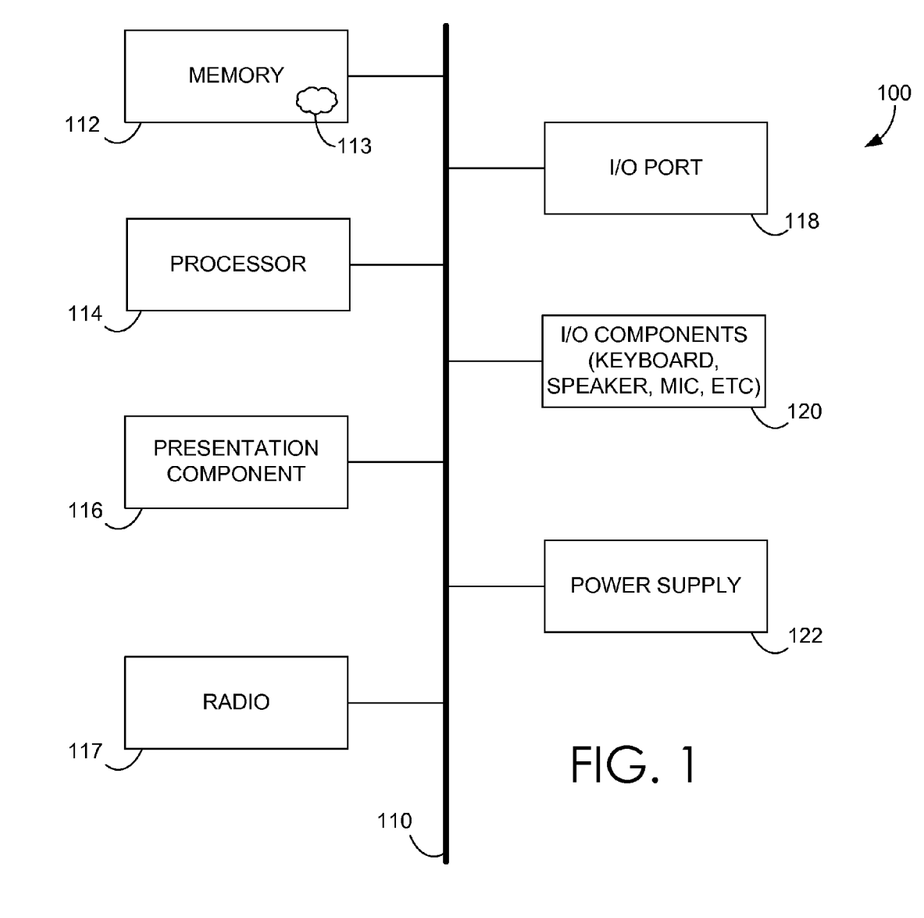
FIG. 1 depicts a block diagram of an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

Embodiments of the present invention relate to detecting data fraud based on identification of a type of device being used in association with one or more credentials. In this regard, a device using one or more credentials may be identified as fraudulent when the device type does not align with a device type expected for such credentials. Stated differently, data usage associated with one or more credentials may be identified as fraudulent when a recognized device type of the utilized device does not match with an expected type of device for the credentials. A credential, as used herein, refers to an identifier that identifies or indicates a user device. A credential may be, but is not limited to, an electronic serial number (ESN), a mobile identification number (MIN), or a network access identifier (NAI).

In committing data fraud, a fraudulent device may clone credentials associated with a legitimate device. By cloning credentials of a legitimate device, the fraudulent device can utilize the credentials to fraudulently access a network (e.g., a network provided by a service provider) and utilize data and/or voice services provided therein (e.g., make phone calls, use the internet, or engage in other activities).

In implementation, embodiments of the present invention enable such fraudulent activity to be recognized or identified based on a predicted device type of the device being utilized. That is, fraudulent activity can be identified when the predicted device type of the device being used does not correspond or match with the expected device type. Identifying or recognizing a predicted device type and/or an expected device type is described more fully below.

Generally, a device type refers to a type of device being used to access a network, such as a telecommunications network, to acquire data and/or voice services. In some embodiments, a particular device type may be recognized or designated when the particular device type is associated with features or characteristics that indicate such a device type. As such, device types may be generated as data begins to demonstrate or indicate association with a particular type of device. Examples of device types include, but are not limited to, a feature device, a smart device, and an air card. A feature device refers to a device that may make phone calls, receive and send text messages and provide limited web browser capabilities. In one embodiment, a feature device does not support third-party software programs. A smart device refers to a device that may make phone calls, receive and send text messages, and provide advanced web browser capabilities. In one embodiment, a smart device supports third-party software programs. An air card device refers to a type of wireless broadband modem used for connecting to cellular networks.

In embodiments, such types of devices can be designated as data is captured and analyzed in association with such devices and indicates features and/or characteristics associated with the devices. For instance, and as described more fully below, one characteristic can be associated with a smart device, another characteristic associated with a feature device, and yet another characteristic associated with an air card.

Figure 2:
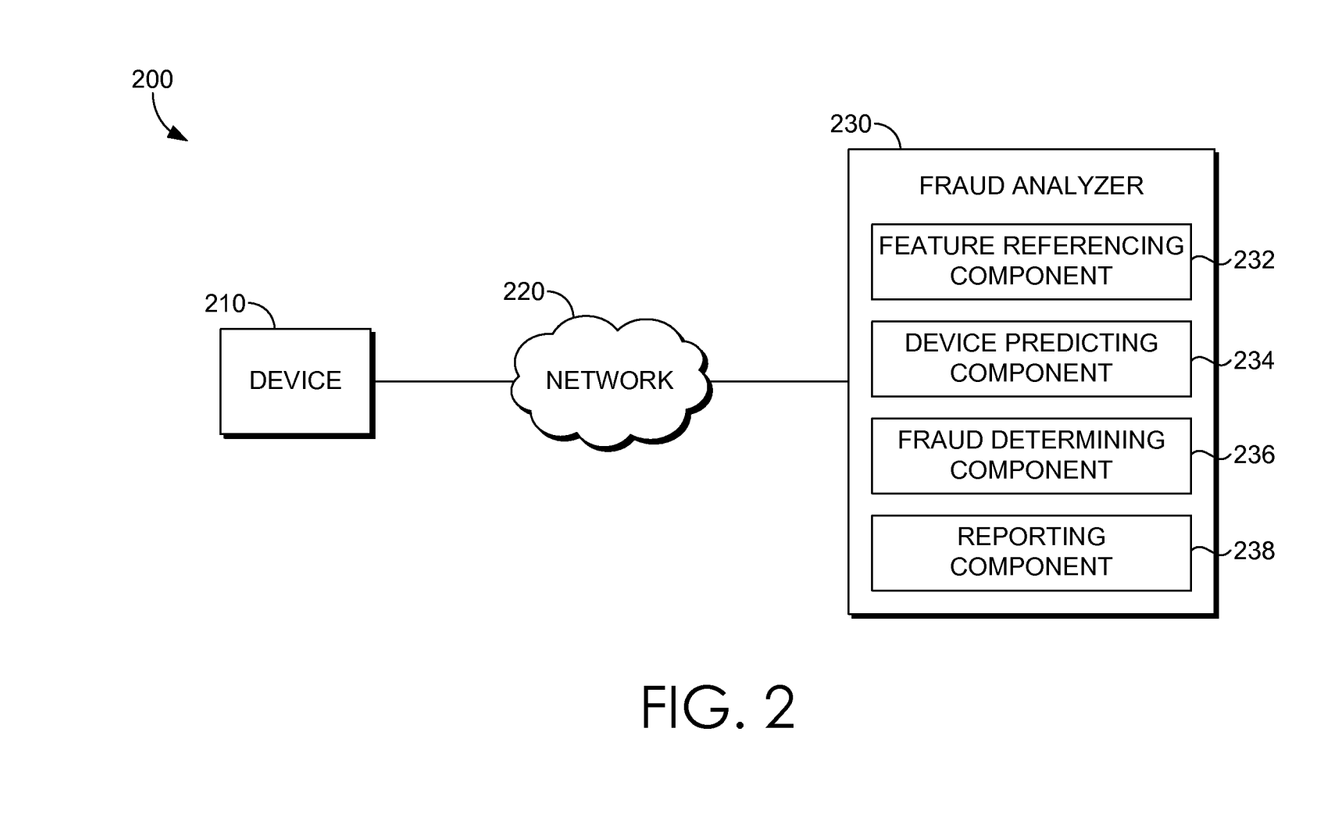
FIG. 2 is a schematic view of an exemplary network environment that includes a fraud analyzer, suitable for use in implementing embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope or functionality of the invention. Neither should the network environment be interpreted as having any dependent or requirement relating to any one or combination of components illustrated. For example, the network environment 200 may include components not shown in FIG. 2.

Network environment 200 comprises a device 210, a network 220, and a fraud analyzer 230. In the network environment 200, the device 210 may communicate with, or be used to communicate with, other devices, such as mobile devices, servers, etc. The device may take on a variety of forms, such as a mobile phone, a smart phone, an air card, or any device that may use a network or be connected to a network for data and/or or communication services. For example, the device 210 can take on any form, such as, for example, a mobile device or any other computing device (or computing device component/attachment) capable of wirelessly communicating with other devices using a network. Makers of illustrative devices include, for example, Research in Motion, Creative Technologies Corp., Samsung, Apple Computer, and the like. A device can include, for instance, a display(s), a power source(s) (e.g., a battery), a data store(s), a speaker(s), memory, a buffer(s), and the like. In embodiments, the device 210 comprises a wireless or mobile device with which a wireless telecommunications network(s) can be utilized for communication (e.g., voice and/or data communication). In this regard, the device can be any mobile computing device that communicate by way of, for example, a 3G or 4G network.

The device 210 can utilize network 220 to communicate with other computing devices (e.g., a mobile device(s), a server(s), a personal computer(s), etc.). In embodiments, the network 220 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 220 can include multiple networks, as well as being a network of networks, but is shown in more simple form so as to not obscure other aspects of the present invention. The network 220 can be part of a telecommunications network that connects subscribers to their immediate service provider. In embodiments, the network 220 can be associated with a telecommunications provider that provides services to user devices, such as device 210. For example, the network 210 may provide voice and/or data services to devices or corresponding users that are registered or subscribed to utilize the services provided by a telecommunications provider. The network 220 can be any communication network providing voice and/or data services, such as, for example, a 1× circuit voice, a 3G network (e.g., CDMA, CDMA2000, WCDMA, GSM, UMTS), or a 4G network (WiMAX, LTE, HSDPA).

The fraud analyzer 230 is used to analyze and/or detect data fraud or fraudulent activities in association with user devices, such as device 210. In this regard, the fraud analyzer 230 facilitates a determination of whether a particular device being used is performing fraudulent activity(s) or fraudulent data usage (e.g., indicate whether a device is fraudulent or legitimate). To do so, embodiments of the invention utilize identification of a type of device associated with the device to detect data fraud. In embodiments, the fraud analyzer 230 includes a feature referencing component 232, a device predicting component 234, a fraud determining component 236, and a reporting component 238.

The feature referencing component 232 references one or more device-feature characteristics associated with the device 210. That is, the feature referencing component 232 references characteristics associated with a device or device credentials being used to access a network, such as network 220. A device feature refers to any feature of a device that can be used to classify or categorize a device into a particular device type. In this regard, a device feature can be associated with varying extents of values that may indicate a particular type of device (e.g., a feature device, a Smart device, or an air card). By way of example, and without limitation, a device feature may be a traffic volume, an application profile, or a malicious traffic generation. A traffic volume (e.g., total traffic volume) may refer to the measured volume of traffic related to a device as measured over a certain period of time. An application profile refers to the traffic volume and associated applications used by a device over a certain period of time. A malicious traffic generation refers to the malicious traffic generated by a device.

Such device features are only exemplary in nature and are not meant to limit the scope of the present invention. That is, additional or alternative device features, or characteristics associated therewith, can be used to determine if a device is a fraudulent device.

A device-feature characteristic (or characteristic) refers to an indication of an extent or scope of a particular device feature for a device. Such an indication might be a numerical, textual, symbolical, or other code, value, or pattern indicator of an extent of a particular device feature associated with a device. A pattern may be, for example, a diurnal pattern, a temporal pattern or any other pattern that indicates the behavior of a device. As previously described, such characteristics are used to designate or identify a type of a device. For instance, characteristics of a particular device feature may vary according to different device types. Because the characteristics of the device features may be unique or specific to each device type, the characteristics may be used to determine a device type. By way of example only, assume that the total traffic volume of a feature device is generally associated with a first characteristic (e.g., 0.6 bytes), while the total traffic volume of a smart device is generally associated with a second characteristic (e.g., 0.8 bytes). Now assume that a characteristic of a total traffic volume associated with a particular device being used to access a network is 0.82 bytes. In such a case, the device can be identified, designated, or predicted to be a smart device. In this way, the measured number of bytes of the total traffic volume of a particular device is a characteristic that may be used to determine the type of device.

In some cases, the feature referencing component 232 may reference one or more characteristics of a device by communicating with the device, such as device 210. For instance, the feature referencing component 232 might receive or retrieve characteristics associated with a particular device by communicating with the device. In other cases, the feature referencing component 232 may reference one or more characteristics associated with a device by communicating with a component in a telecommunications network, such as network 220, that can provide data related to characteristics of device 210. For example, a home agent, a router, an access point, or other component within a network may provide (e.g., automatically provide or provide upon request) characteristics associated with a device. In some instances, a user device and/or network component(s) might provide raw data to the feature referencing component 232, which can then use such data to identify or derive a characteristic(s) for the device.

As can be appreciated, in some embodiments, the referenced characteristics may be associated with a certain period of time. In this regard, the feature referencing component 232 might reference characteristics associated with or captured during a particular period of time. The period of time may vary from, but not limited to, a few seconds to several days.

The device predicting component 234 is configured to determine a predicted device type of the device 210. In other words, device predicting component 234 predicts a device type associated with a device and/or credentials being used to access a network, such as network 220. Upon referencing one or more characteristics associated with one or more features for a device, the device predicting component 234 can utilize such characteristics to determine or identify a predicted device type of the device 210. As used herein, a predicted device type refers to the device type that is predicted for a device based on one or more characteristics associated with the device and/or credentials being used by the device.

In one embodiment, the device prediction component 234 may determine a predicted device type for device 210 using the referenced characteristics associated with the device. In this way, the characteristics associated with a device can be compared to a set of representative characteristics for device types. Representative characteristics refer to characteristics corresponding with a feature(s) that have been determined to be associated with or correspond with a particular type of device. Such representative characteristics regarding an association between a feature and device types may be stored in one or more data stores. As such, to determine a predicted device type, a set of one or more representative characteristics can be referenced (e.g., from one or more data stores (not shown)). Thereafter, the characteristics associated with the device can be compared to the set of representative characteristics to identify a predicted device type for the device.

By way of example only, assume that a first representative characteristic(s) of a traffic volume feature indicates that a smart device is generally associated with 0.8 bytes of total traffic volume, and a second representative characteristic of the traffic volume feature indicates that a feature device is generally associated with 0.6 bytes of total traffic volume. Now assume that a characteristic associated with the traffic volume feature for a particular device being used is identified as 0.82 bytes of total traffic. By comparing the 0.82 bytes of total traffic with the representative characteristics (i.e., 0.6 and 0.8), it can be determined that the particular device corresponds or aligns with characteristic of a smart device. Using such a comparison and, in some cases, other characteristic comparisons associated with other features, the particular device type can be predicted to be a smart device. Accordingly, the measured number of bytes of the total traffic volume of a particular device is a characteristic that may be used to determine the type of device (e.g., via a comparison to one or more representative characteristics corresponding with the traffic volume feature).

As can be appreciated, in some cases, a feature for a particular type of device may correspond to a single representative characteristic. For instance, such a representative characteristic might be an average value, a median value, or a mode value that is associated with collected data from a plurality of devices. In other cases, a feature for a particular type of device may correspond to multiple representative characteristics. For example, collected or captured characteristics associated with a plurality of devices might be aggregated and used as representative characteristics for comparison to a characteristic obtained for a particular device.

The fraud determining component 236 determines if device 210 is a fraudulent device. In an embodiment, the fraud determining component 236 compares the predicted device type to an expected device type. As used herein, an expected device type is a device type that is expected for a device based on one or more credentials being used by the device. Accordingly, one or more credentials associated with or used by device 210 can be used to lookup a device type that corresponds with such credential(s). If the predicted device type matches the expected device type, the device is not deemed fraudulent (at least based on a device type comparison). On the other hand, if the predicted device type does not match the expected device type, the device is deemed to be fraudulently using data services or flagged as potentially fraudulent use of data.

As previously described, a credential may be an electronic serial number (ESN), mobile identification number (MIN), an network access identifier (NAI), or the like. As used in this specification, an ESN is an alphanumeric code uniquely associated to a specific device. An MIN is a 10 digit unique number that a network uses to identify a mobile phone. An NAI is a user identity. In general, a credential is any alphanumeric code that may be associated with a specific device. Additionally or alternatively to an ESN, MIN, or NAI, other credentials may be used to determine if a device is fraudulently using data.

Figure 3:
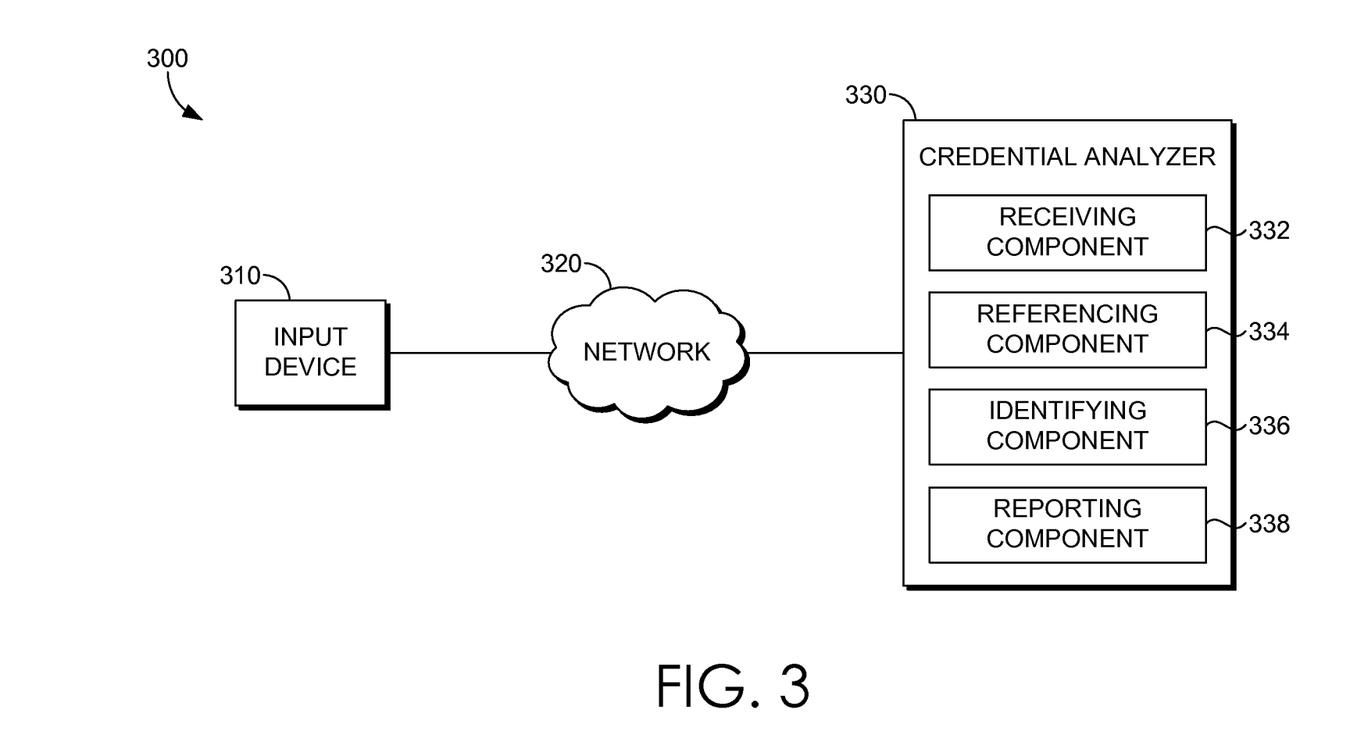
FIG. 3 is a schematic view of an exemplary network environment that includes a credential analyzer, suitable for use in implementing embodiments of the present invention.

In some cases, the expected device type for use in determining fraud can be obtained via the fraud determining component 236. In other cases, the expected device type for use in determining fraud can be obtained or referenced from another component or set of components. FIG. 3 illustrates one embodiment for determining an expected device type using a credential analyzer 330. FIG. 3 provides an exemplary network environment suitable for use in implementing embodiments of the present invention. Such a network environment is illustrated and designated generally as network environment 300. Network environment 300 is but one example of a suitable network environment and is not intended to suggest any limitation as to the scope or functionality of the invention.

In FIG. 3, the credential analyzer 330 includes a receiving component 332, a referencing component 334, an identifying component 336, and a reporting component 338. The receiving component 332 receives data associated with the credentials of a device. In this regard, the receiving component 332 might receive one or more credentials associated with or being used by device 310. In an embodiment, the referencing component 334 references data within a data store that includes an association between one or more credentials and one or more device types. For instance, the data may indicate that a first credential is associated with a first device type and a second credential is associated with the second device type. Data contained within the data store can be provided in any manner. For instance, during device registration, the device credentials and/or the device type can be input into a computing device that is associated with the network provider.

The identifying component 336 identifies an expected device type associated with the received one or more credentials. For example, the received one or more credentials can be located within the data referenced in the data store and the corresponding device type can be identified (e.g., via a lookup system or algorithm). Upon identifying the expected device type, the reporting component 338 provides an indication of the expected device type to the fraud determining component 233 of FIG. 2. For instance, the expected device type can be automatically communicated from the credential analyzer 330 or retrieved from the fraud analyzer 230.

Returning to FIG. 2, the reporting component 238 is configured to provide an indication that the device 210 is a fraudulent and/or a legitimate device. In some cases, the reporting component 238 only provides an indication that a device is fraudulent or is being used in a fraudulent manner. In other words, when data fraud is not detected, the reporting component 238 does not report a legitimate device. In other cases, the reporting component 238 provides an indication of a fraudulent or a legitimate device upon such a determination being made, for example, by the fraud determining component 236.

As can be appreciated, the reporting component 238 can provide an indication of fraudulent and/or legitimate data use to any number or type of components. For instance, such an indication can be provided to another component in the network that collects, monitors, or enforces data fraud, etc.

As previously described in reference to the device predicting component 234 of FIG. 2, a characteristic(s) of a device being used can be compared to a representative characteristic(s) to identify or determine fraudulent data usage. A representative characteristic for a feature can be identified in any manner or number of ways, for example, using data collected in association with a plurality of devices. For exemplary purposes, data collected and analyzed in relation to the device features of three device types, the feature phone, smart phone and air card, is discussed in detail below according to FIGS. 4-11. Such analysis shows the various characteristics that may be associated with device types.

Figure 4:
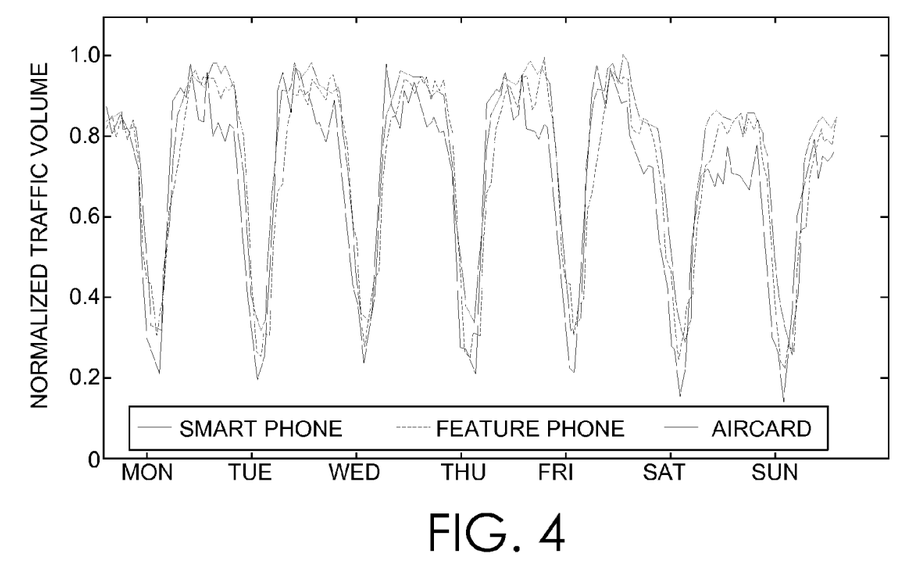
FIG. 4 is an exemplary schematic diagram associated with a diurnal pattern and normalized traffic volume of various device types.

Referring initially to the traffic volume, FIG. 4 shows the normalized aggregate data traffic volume (measured in bytes) generated by each type of device (smart phone, feature phone, and air card) at per-hour granularity for a certain period of time, one week. There are clearly strong diurnal fluctuations in the traffic volume across all types of device, and the observed fluctuations follow very similar patterns. Each day, the busy period is observed to be from 7:00 am to 9:00 pm. The lowest hourly traffic volume occurs between 2:00 am and 3:00 am. This diurnal pattern coincides with the typical work schedule of cellular users.

Figure 5:
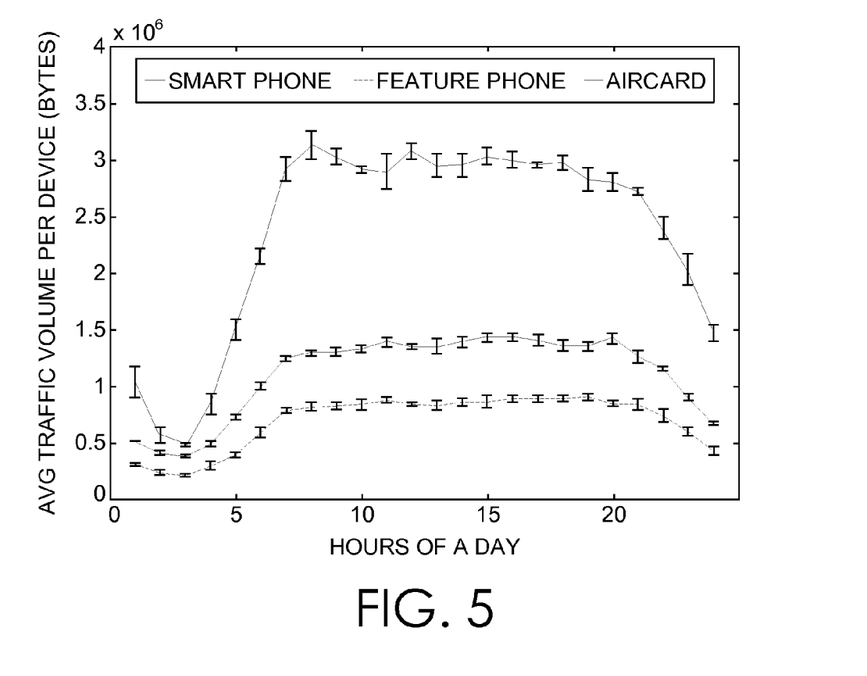
FIG. 5 is an exemplary schematic diagram associated with the traffic volume in relation to hours of a day of various device types.

FIG. 5 plots the mean and standard deviation of the average per-hour IP traffic volume per individual device (that uses data service) for different times of the day for each device type. The means and standard deviations are calculated from the observed average traffic volumes observed in the same hour of each working day throughout a month. FIG. 5 shows the same diurnal pattern of traffic volume fluctuations as observed in FIG. 4. Moreover, none of the standard deviations in FIG. 8 are very substantial, which indicate that the average per-hour IP traffic volume is relatively stable across all 31 days, and this stability is prevalent among all types of devices. FIG. 5 also reveals the difference in bandwidth/resource demand of a single device depending on its type. For example, the average IP traffic volume (hence bandwidth consumption) of a single air card is around 2.5 times that of a smart phone, and around 4.5 times of what a typical feature phone generates.

Figure 6:
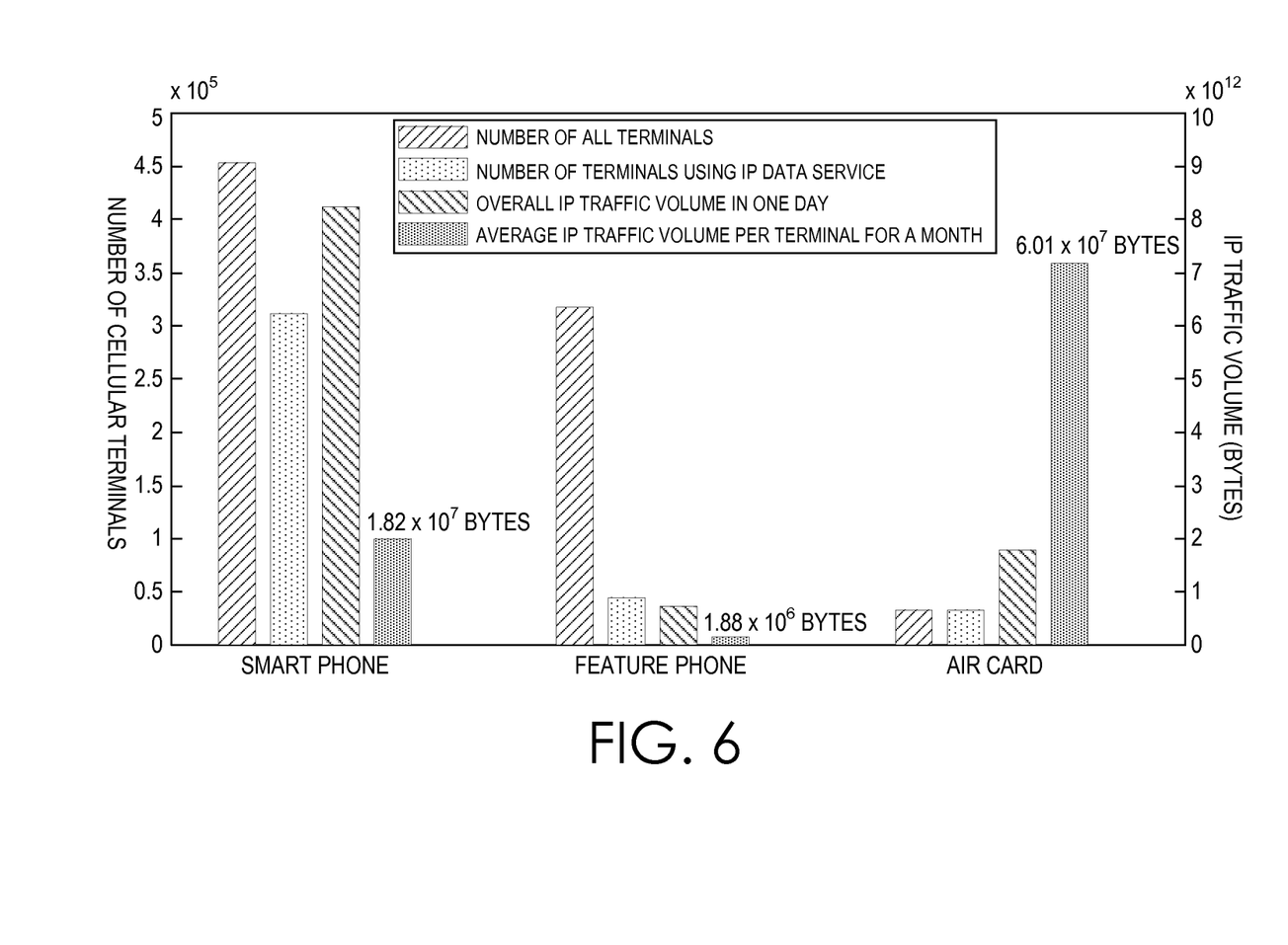
FIG. 6 is an exemplary schematic diagram associated with the traffic volume of various device types.

FIG. 6 summarizes statistics of a number of data-service subscribers and a total number of devices for each category (smart phone vs. air card vs. feature phone), along with the associated IP traffic volume. 69.4% of smart phone users are data service users, and the remaining 30.6% only make phone calls or send short messages. On the other hand, only 12.37% among subscribers using feature phones use data service. If all the terminals are taken into account, the actual ratios between the average IP traffic volume generated by a typical air card, smart phone, and feature phone are around 36.3:9.8:1.

Figure 7:
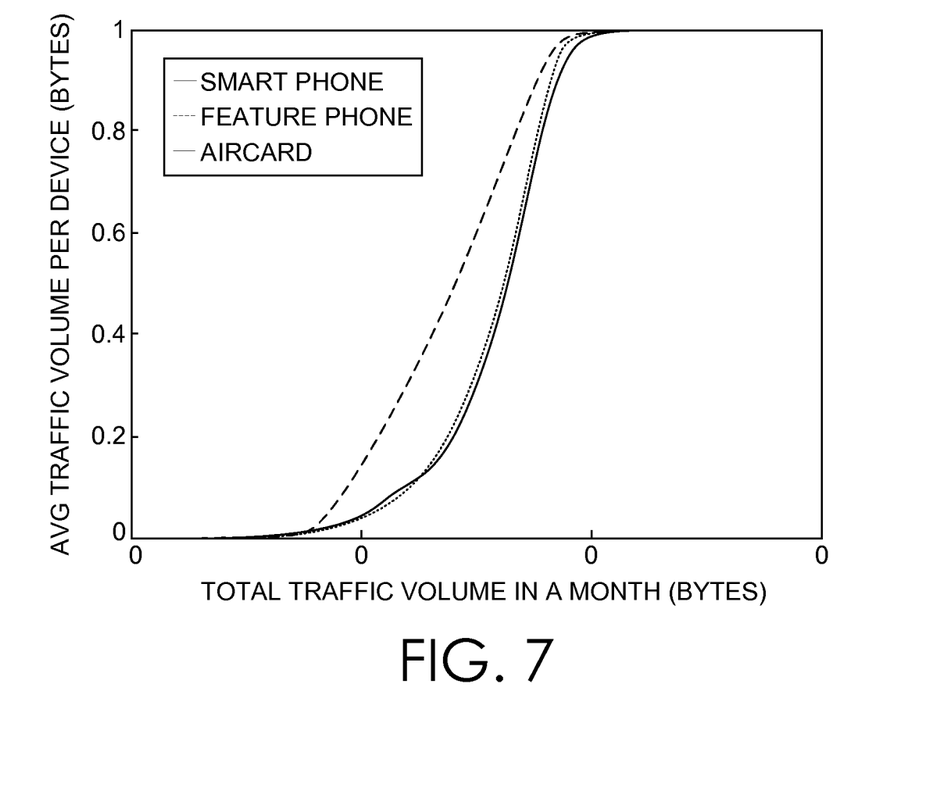
FIG. 7 is an exemplary schematic diagram associated with the traffic volume per device type.

FIG. 7 shows the cumulative distribution function for the IP traffic volume distribution of all cellular terminals for each device type. FIG. 7 shows that the distributions for smart phones and air cards are similar with each other, while the cumulative distribution function (CDF) of feature phones shows a larger spread (diversity) of traffic volume among individual terminals. For both smart phones and air cards, the monthly traffic volume correspond to almost 80% of all terminals that are within the range of 5 MBytes to 1 GBytes, while in the case of feature phones the same percentage covers a much larger range from 100 KBytes to 1 GBytes, and more than 30% of feature phones are within the range of 100 KBytes to 5MBytes. A wider range of diversity in terms of data traffic usage makes it more challenging for cellular carriers to project overall data traffic growth for resource provisioning purposes.

Figure 8A:
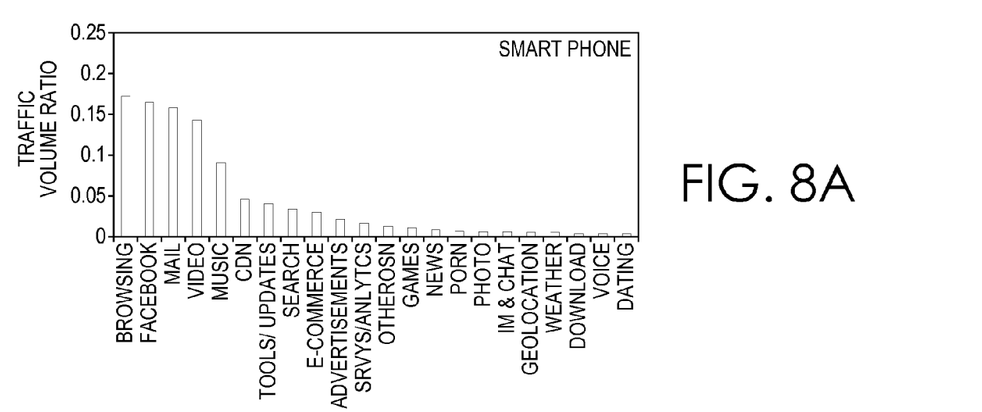
FIGS. 8A, 8B and 8C are exemplary schematic diagrams associated with the application profile of various device types.
Figure 8B:
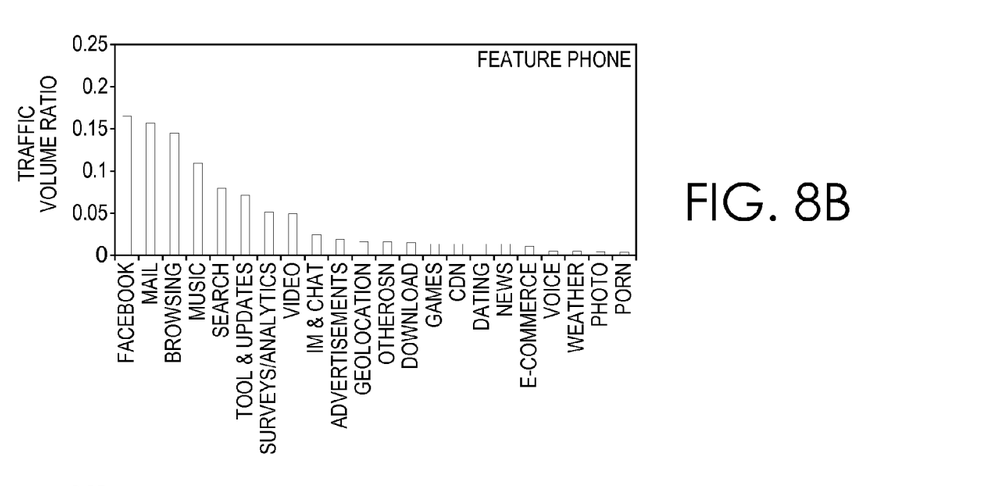
Figure 8C:
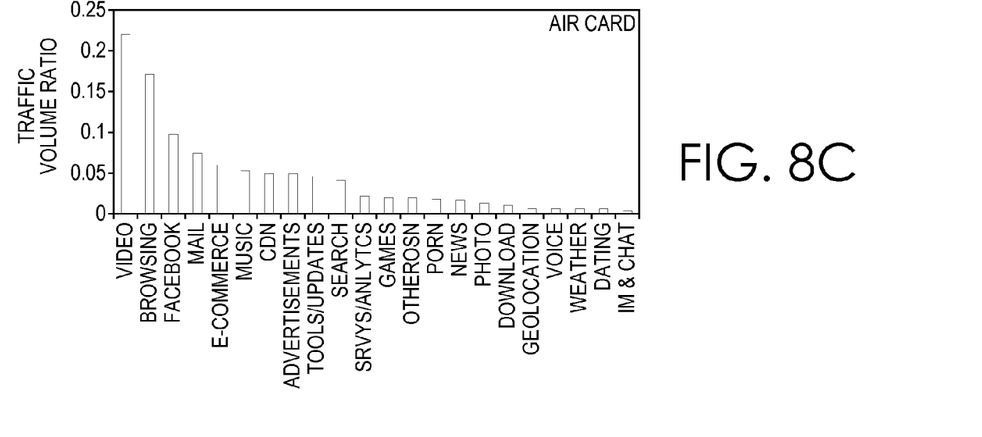

In relation to the application profile feature, FIGS. 8A, 8B, and 8C show the application profiles of a smart phone, a feature phone, and an air card by displaying the distribution of traffic volume with respect to different categories of data applications. It is obvious that the traffic loads contributed by different application categories are quite distinct from each other.

Furthermore, FIGS. 8A, 8B, and 8C show that the proportions of IP traffic generated by some categories of applications, such as video, music, e-commerce and content distribution network (CDN), vary dramatically among smart phones, feature phones, and air cards. Most of these differences can be explained by the variance in devices' capabilities. For instance, the video applications generate only 5% of IP traffic on feature phones, while the percentages on smart phones and air cards are around 15% and 20% respectively.

Figure 9A:
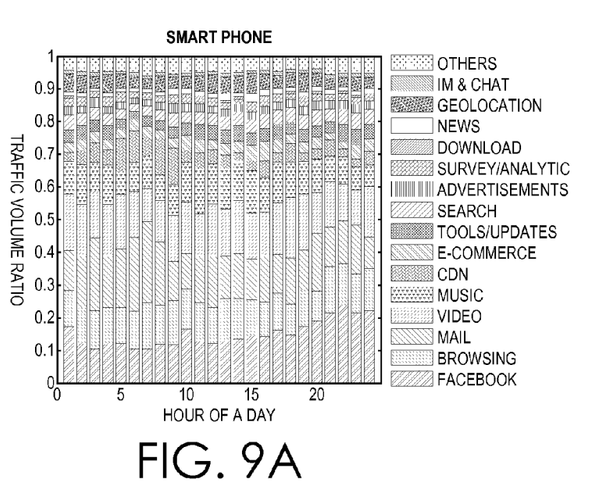
FIGS. 9A, 9B, and 9C are exemplary schematic diagram associated with the application profiles by the hour of various device types.
Figure 9B:
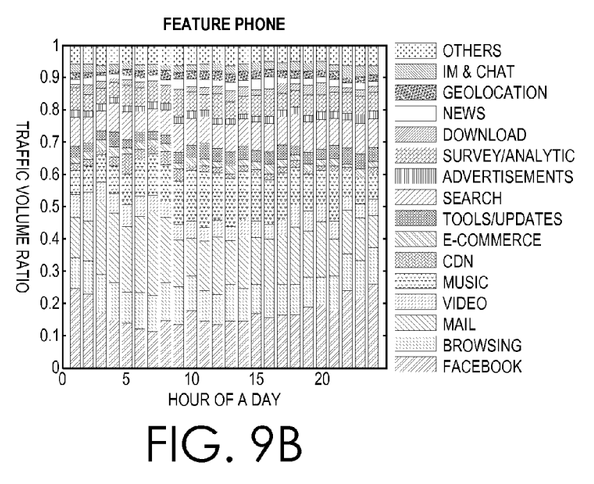
Figure 9C:
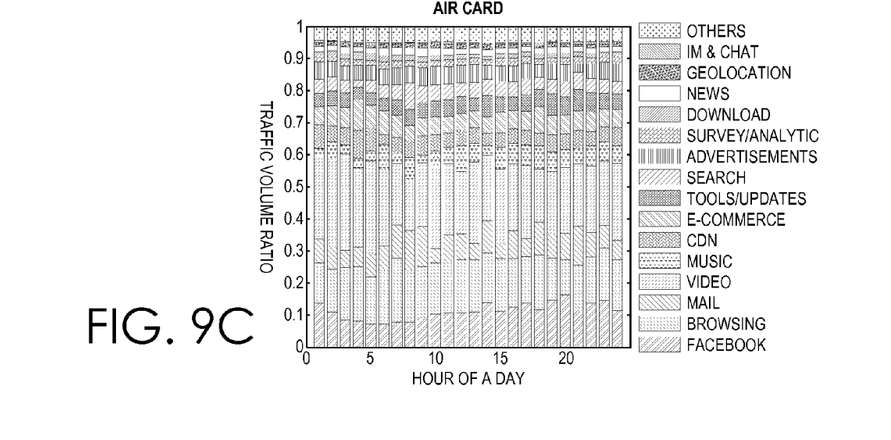

FIGS. 9A, 9B, and 9C illustrate how proportions of IP traffic generated by different categories of data applications change across different hours of a day. It is shown how the proportions of IP traffic generated by different categories of data applications change over time. There are no strong diurnal fluctuations in the traffic volume distribution with respect to application categories. This conclusion holds for all types of devices. A few exceptions may include FACEBOOK, which accounts for a slightly larger percentage of traffic during the evening than in other hours of the day.

In regards to malicious traffic generated, several fundamental features of malicious traffic generated by different types of cellular devices are characterized by identifying and analyzing port scan traffic in cellular networks. In this analysis, two methods are shown to detect port scan traffic. The first method focuses on Transmission Control Protocol (TCP) SYN packets and User Datagram Protocol (UDP) packets that are sent out by cellular terminals that receive no responses. These TCP SYN packets and UDP packets indicate failed connection attempts, which usually reveal malicious activities. The sources of non-responded packets as potential attackers are marked, and then two thresholds are used to further classify potential attackers into normal users and real attackers. The first threshold is the number of failed connections initiated by a device in half an hour. Such a threshold can detect active attackers that generate a burst of port scan traffic in a short time. The second threshold is on the total number of failed connections a cellular device initiates in a whole day. Such a threshold is designed to detect the port scan traffic, such as the scans initiated by worms, that is generated at a low rate but will accumulate to a large volume over a longer period. A cellular device that meets either thresholds will be identified as an attacker. According to the data collected, in one embodiment, the two thresholds are 500 failed connections in half an hour and 2000 failed connections in a day.

The second method for malicious traffic detection is to monitor the packets destined for unused IP addresses. This approach has been proven to be useful for measuring a variety of abnormal behaviors. IP blocks that are not in common use are identified and all the packets sent to those IP blocks as malicious traffic are classified. More than 90% of packets sent to the unused IP blocks are also detected as port scan traffic by the first method that track TCP SYN or UDP packets that are not responded to. Other potential causes of malicious traffic, such as DOS attacks, IP address bytes-order misconfiguration, improper distribution of routing information, and abuse of P2P software, are rarely observed in the cellular network data trace.

Figure 10:
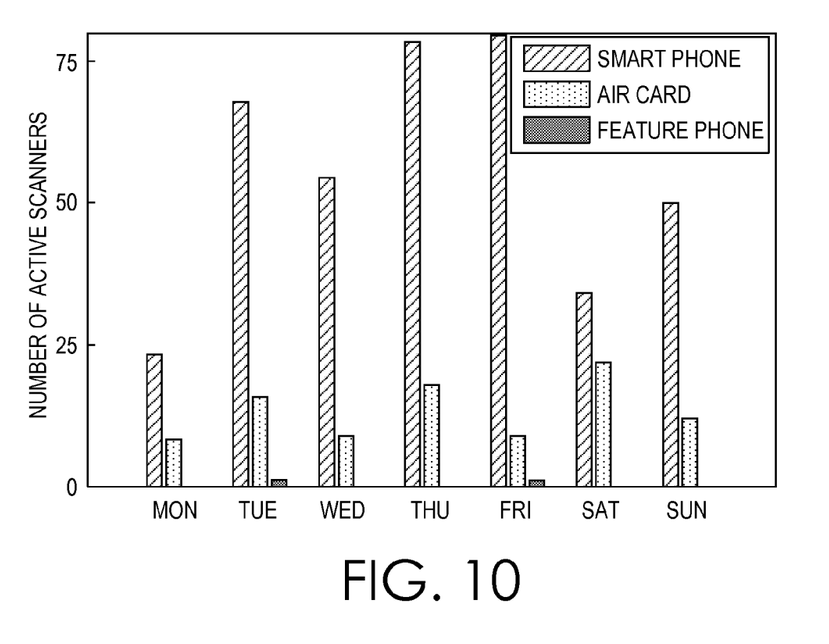
FIG. 10 is an exemplary schematic diagram associated with the number of active scanners of various device types.

As indicated above, by identifying and analyzing port scan traffic, several fundamental features of malicious traffic generated by different device types may be characterized. FIG. 10 shows a number of active port scanners in each day through a week. It is shown that only two feature phones are detected (on Tuesday and Friday respectively), and most scanners reside on smart phones and air cards.

Figure 11:
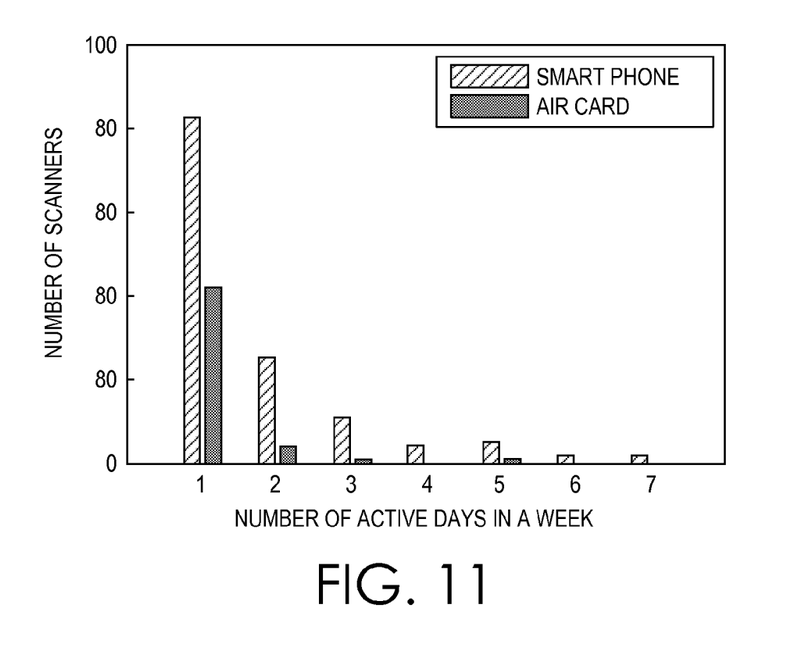
FIG. 11 is an exemplary schematic diagram associated with the number of active scanners in a week of various device types.

FIG. 11 illustrates a histogram of a number of active days for all port scanners. For both smart phone and air card scanners, the majority are only detected in one day throughout the whole week. However, compared with air cards, a larger portion of smart phone scanners are active for more than one day in the week. Several smart phone scanners are even detected in six or seven days while the most active air card scanner only appears in five days through the week. As such, it seems that smart phones are more preferred platforms for long term scanning while air cards, although more likely to be used as scanners, are usually leveraged for short scanning missions.

As shown above with respect to FIGS. 4-11, the analysis of various device features allows for device characteristics to be associated with device types. Such features are exemplary in nature and are not intended to limit the scope of embodiments of the present invention. The association between device characteristics and devices types may be used by embodiments of the present invention to detect data fraud and identify a fraudulent device, as described herein.

Figure 12:
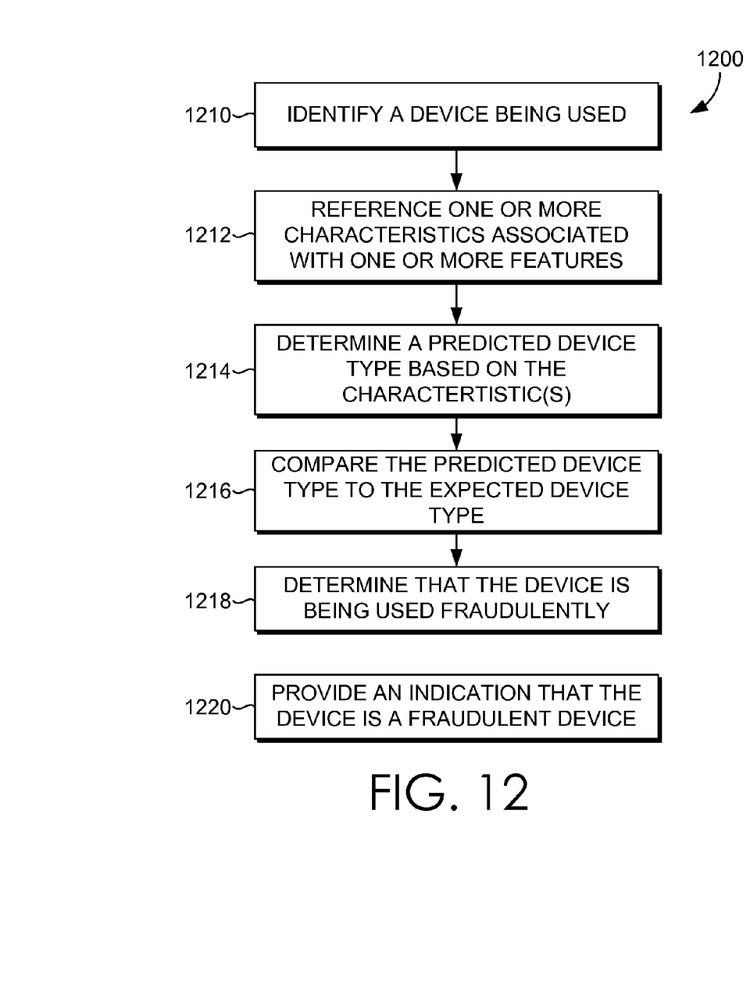
FIG. 12 is a flow diagram illustrating an exemplary method for detecting potential data fraud associated with device characteristics, in accordance with an embodiment of the present invention.
Figure 13:
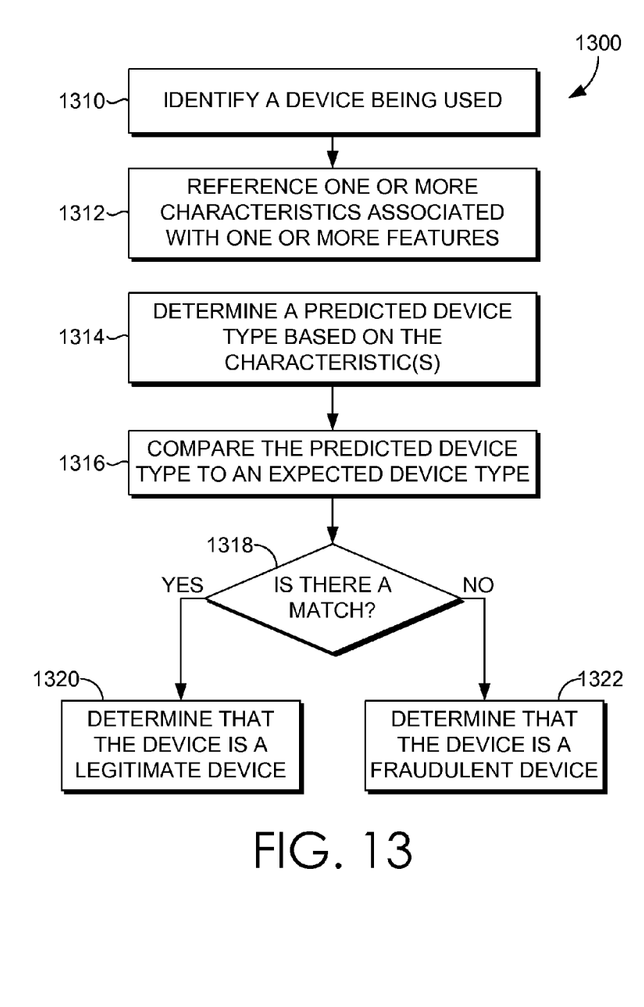
FIG. 13 is a flow diagram illustrating an exemplary method for detecting potential data fraud associated with device characteristics, in accordance with an embodiment of the present invention.
Figure 14:
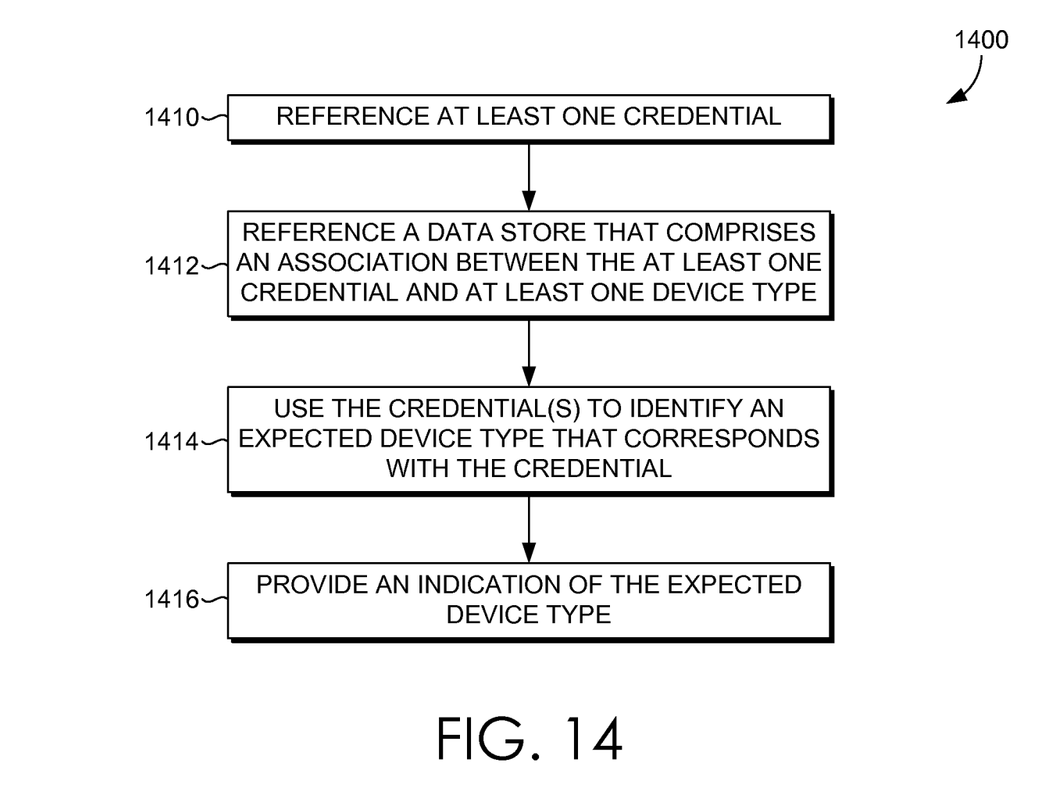
FIG. 14 is a flow diagram illustrating an exemplary method for detecting potential data fraud associated with device credentials, in accordance with an embodiment of the present invention.

Turning now to FIGS. 12-14, FIGS. 12-14 illustrate methods for implementing various embodiments of the present invention. Initially, FIG. 12 is a flow diagram illustrating an exemplary method 1200 for determining whether a device is performing fraudulent activity. In embodiments, method 1200 can be performed using various devices and components, such as those illustrated in FIG. 2.

Initially, as block 1210, a device being utilized is identified or recognized. For example, one or more credentials associated with a device being used are received or otherwise identified. At block 1212, one or more characteristics associated with one or more features for a device are referenced. For example, for a device being used, a first characteristic indicating an extent or attribute of a first feature and a second characteristic indicating an extent or attribute of a second feature can be obtained. Such characteristics might be obtained, for example, via the device or a component(s) in the network. In a specific example, the FACEBOOK traffic volume ratio or other characteristics similar to those found in FIG. 11A may be obtained, for example, from an application profile associated with device 210. At block 1214, a predicted device type of the device is determined based on the one or more device characteristics. In an embodiment, the determination may include referencing a data store that includes one or more representative characteristics associated with one or more features that indicate or correspond with a type of device, such as a smart phone, feature phone and air card. For example, the characteristics of the device and data from the data store may be used to determine that the device type is a smart phone. Thereafter, at block 1216 the predicted device type is compared to the expected device type. In embodiments, such an expected device type can be determined by one or more credentials to look up a device type corresponding therewith. At block 1218, based on the comparison between the predicted device type and the expected device type, a determination is made that the device being used to access a network is a fraudulent device or is being used fraudulently. At block 1220, an indication is provided that device 210 is a fraudulent device or is being used fraudulently.

FIG. 13 shows a flow diagram illustrating another exemplary method 1300, similar to that of method 1200, for determining whether a device is being fraudulently used to obtain data and/or voice services. In embodiments, method 1300 can be performed using various devices and components, such as those illustrated in FIG. 2.

Initially, as block 1310, a device being utilized is identified or recognized. For example, one or more credentials associated with a device being used are received or otherwise identified. At block 1312, one or more characteristics associated with one or more features for a device are referenced. For example, one or more characteristics describing or indicating a feature of malicious traffic generated by the device may be referenced. Such characteristics can be obtained, for example, from the device or a component in the network. In one example, a number of active scanners or other characteristics similar to those found in FIG. 13 may be obtained in accordance with malicious traffic. At block 1314, a predicted device type is determined based on the referenced characteristics. In an embodiment, the determination may include referencing a data store that comprises one or more representative characteristics related to various features corresponding with particular device types, such as smart phones, air cards and feature phones (e.g., as shown in FIG. 13). Thereafter, at block 1316, the predicted device type is compared to an expected device type. In embodiments, such an expected device type can be determined by one or more credentials to look up a device type corresponding therewith. At block 1318, it is determined whether the predicted device type matches the expected device type. If there is a match, then the device is determined to be a legitimate device at block 1320. On the other hand, if there is not a match, then the device is determined to be a fraudulent device or being used for fraudulent activity, as indicated at block 1322.

FIG. 14 shows a flow diagram illustrating an exemplary method of determining an expected device type based on one or more credentials. In embodiments, method 1400 can be performed using various devices and components, such as those illustrated in FIG. 3.

Initially, at block 1410, at least one credential is referenced. For example, a credential(s) might be received, retrieved, or otherwise referenced or obtained. For instance, an ESN may be received in accordance with a device being used. Subsequently, at block 1412, a data store including associations between the at least one credential and at least one device type is referenced. At block 1414, the at least one credential is used to identify an expected device type that corresponds with the credential. At block 1416, an indication of the expected device type is provided. In some embodiments, such an indication may be provided to or retrieved by a component in network 200, 300 or other additional networks.

As can be understood, embodiments of the present invention provide systems, computer-readable media and methods for detecting potential data fraud. The present invention has been described in relation to particular embodiments, which are intended to in all respects be illustrative rather than restrictive. Alternative embodiments will become apparent to those of ordinary skill in the art to which the present invention pertains without departing from its scope. While the invention is susceptible to various modifications and alternative constructions, certain illustrated embodiments thereof are shown in the drawings and have been described in detail. It should be understood, however, that there is no intention to limit the invention to the specific forms disclosed, but on the contrary, the intention is to cover all modifications, alternative constructions, and equivalents failing within the spirit and scope of the invention.

It will be understood by those of ordinary skill in the art that the order of steps described in the present invention are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computerized method for detecting data fraud performed via mobile devices, the method comprising:
    referencing a characteristic associated with a device, the characteristic including at least a temporal bandwidth consumption providing an indication of a device type for the device, wherein the device type includes at least one of: a smart phone, feature phone, or air card;
    determining a predicted device type of the device based on the characteristic;
    comparing the predicted device type to an expected device type that is a device type expected for the device based on one or more credentials being used by the device; and
    determining that the device is potentially performing data fraud based on the predicted device type not matching the expected device type.

2. The method of claim 1, further comprising:
    receiving the one or more credentials;
    referencing a data store that comprises an association of the one or more credentials and at least one device type; and
    using the one or more credentials to identify the corresponding device type as the expected device type.

3. The method of claim 2, wherein the one or more credentials comprise one or more of the following:
    an electronic serial number (ESN), a mobile identification number (MIN), or a network access identifier (NAI).

4. The method of claim 1, wherein the characteristic indicates a diurnal pattern for data traffic of the device.

5. The method of claim 1, wherein the characteristic indicates a total traffic volume for a period of time of the device.

6. The method of claim 1, wherein the characteristic indicates an application profile of the device.

7. The method of claim 1, wherein the characteristic indicates a reference of a malicious traffic generated by the device.

8. The method of claim 1, wherein the predicted device type is determined by comparing the characteristic to a set of representative characteristics that represent characteristics corresponding with various types of devices.

9. A system for detecting potential data fraud, the system comprising:
    a feature referencing component that references one or more characteristics associated with a device being used, the one or more characteristics including at least a temporal bandwidth consumption of the device;
    a device predicting component that predicts a device type using the one or more characteristics associated with the device, wherein the device type includes at least one of: a smart phone, a feature phone, or an air card; and
    a fraud determining component that compares the predicted device type to an expected device type and, based on the comparison, determines whether data fraud is potentially occurring via the device.

10. The system of claim 9, further comprising:
    a receiving component that receives at least one credential, wherein the at least one credential comprises an electronic serial number, a mobile identification number (MIN), or a network access identifier (NAI); and
    an obtaining component that obtains the expected device type associated with the at least one credential from a data store.

11. The system of claim 9, further comprising a reporting component that provides an indication that the device is a fraudulent device.

12. The system of claim 9, wherein the one or more characteristics comprise at least an indication of a diurnal pattern for data traffic of the device.

13. The system of claim 9, wherein the one or more characteristics comprise at least an indication of a total traffic volume for a period of time of the device.

14. The system of claim 9, wherein the one or more characteristics comprise at least an indication of an application profile of the device.

15. The system of claim 9, wherein the one or more characteristics comprise at least an indication of malicious traffic generated by the device.

16. One or more non-transitory computer-readable storage media having computer executable instructions embodied thereon that, when executed, perform a method for detecting potential data fraud, the method comprising:
referencing one or more characteristics associated with one or more features for a device, each of the one or more characteristics indicating a type of device, the one or more characteristics including at least a temporal bandwidth consumption of the device;
using the one or more characteristics associated with the one or more features to determine a predicted device type, wherein the predicted device type is a feature phone, a smart phone, or an air card;
referencing an expected device type associated with at least one credential used by the device to access a telecommunications network;
comparing the predicted device type to the expected device type; and
based on the comparison, determining whether the device is potentially being used to perform data fraud via the telecommunications network, wherein
when the predicted device type matches the expected device type, the device is determined to be a legitimate device, and
when the predicted device type does not match the expected device type, the device is determined to be a fraudulent device.

17. The media of claim 16, wherein the method further comprises:
receiving the at least one credential, wherein the at least one credential comprises an electronic serial number, a mobile identification number, or a network access identifier;
referencing a database that includes a listing of the at least one credential associated with one of a plurality of expected device types; and
obtaining the expected device type associated with the at least one credential.

18. The media of claim 16, wherein the one or more features include one or more of the following: a diurnal pattern for data traffic, a total traffic volume for a period of time, an application profile, or a reference of the malicious traffic generated by the device.

* * * * *